US006994192B1

(12) United States Patent
Chang

(10) Patent No.: US 6,994,192 B1
(45) Date of Patent: Feb. 7, 2006

(54) LOCKING DEVICE FOR TWO-WHEELED VEHICLE

(76) Inventor: Eung-Soon Chang, A-1604 Sinjungdongshervill-1, 85-21, Sinjung-dong, Yangchen-gu 158-070 Seoul (KR)

( * ) Notice: Subject to any disclaimer, the term of this patent is extended or adjusted under 35 U.S.C. 154(b) by 0 days.

(21) Appl. No.: 11/068,528

(22) Filed: Feb. 28, 2005

(30) Foreign Application Priority Data

Feb. 3, 2005 (KR) ...................... 10-2005-0009915

(51) Int. Cl.
*F16D 69/00* (2006.01)
*B62H 5/00* (2006.01)
(52) U.S. Cl. ........................... 188/265; 188/31; 70/233
(58) Field of Classification Search ................. 303/89, 303/1; 188/265, 31, 24.18; 180/219, 287, 180/289; 70/233, 182, 183, 187, 280–282; 280/279; 340/427, 426.1, 432; 307/9.1
See application file for complete search history.

(56) References Cited

U.S. PATENT DOCUMENTS

| | | | | |
|---|---|---|---|---|
| 2,231,546 A | * | 2/1941 | Neiman ........................ 70/233 |
| 3,356,185 A | * | 12/1967 | Isaacks ........................ 188/31 |
| 4,294,090 A | * | 10/1981 | Metzger ....................... 70/226 |
| 4,708,004 A | * | 11/1987 | Allen .......................... 70/226 |
| 4,980,667 A | * | 12/1990 | Ames .......................... 340/427 |
| 5,197,310 A | * | 3/1993 | Pedersen ...................... 70/227 |
| 5,262,757 A | * | 11/1993 | Hansen ........................ 340/427 |
| 5,802,889 A | * | 9/1998 | Arnold ........................ 70/18 |
| 5,819,889 A | * | 10/1998 | Shieh .......................... 188/265 |
| 5,916,279 A | * | 6/1999 | Shieh .......................... 70/33 |
| 5,964,107 A | * | 10/1999 | Chang ......................... 70/33 |
| 6,236,307 B1 | * | 5/2001 | Kurano ........................ 340/426.28 |
| 6,370,928 B1 | * | 4/2002 | Chies et al. ................... 70/278.3 |
| 6,553,793 B1 | * | 4/2003 | Chen ........................... 70/33 |
| 6,615,956 B1 | * | 9/2003 | Chuang ........................ 188/24.18 |
| 6,783,141 B1 | * | 8/2004 | Backhaus ...................... 280/279 |
| 2002/0180273 A1 | * | 12/2002 | Konno et al. ................. 307/10.2 |
| 2003/0024754 A1 | * | 2/2003 | Konno et al. ................. 180/287 |
| 2004/0090306 A1 | * | 5/2004 | Konno et al. ................. 340/5.62 |
| 2005/0103584 A1 | * | 5/2005 | Hogesta ....................... 188/265 |

FOREIGN PATENT DOCUMENTS

JP          2004-300664       * 10/2004

* cited by examiner

*Primary Examiner*—Thomas Williams
(74) *Attorney, Agent, or Firm*—R. Neil Sudol; Henry D. Coleman; William J. Sapone

(57) ABSTRACT

The locking device for a two-wheeled vehicle capable of semi-automatically locking or unlocking a locking device for a two-wheeled vehicle is disclosed. The locking device for a two-wheeled vehicle comprises an engaging unit that includes a rear plate member and an attaching pipe; a receiving casing unit that is engaged at one side surface of the engaging unit and is installed in a direction of an outer side of the wheel support frame; a receiving unit that is engaged at the receiving casing unit, receives an external high frequency through an antenna when it is received through a transmission unit, converts the received high frequency into an intermediate frequency using a RF integrated circuit, transfers to a microcomputer and allows a motor to rotate in one direction in accordance with a control of the microcomputer; and a locking/unlocking unit that is installed in such a manner that a lock appears and disappears between the engaging unit and the receiving casing.

9 Claims, 7 Drawing Sheets

[FIG. 1]
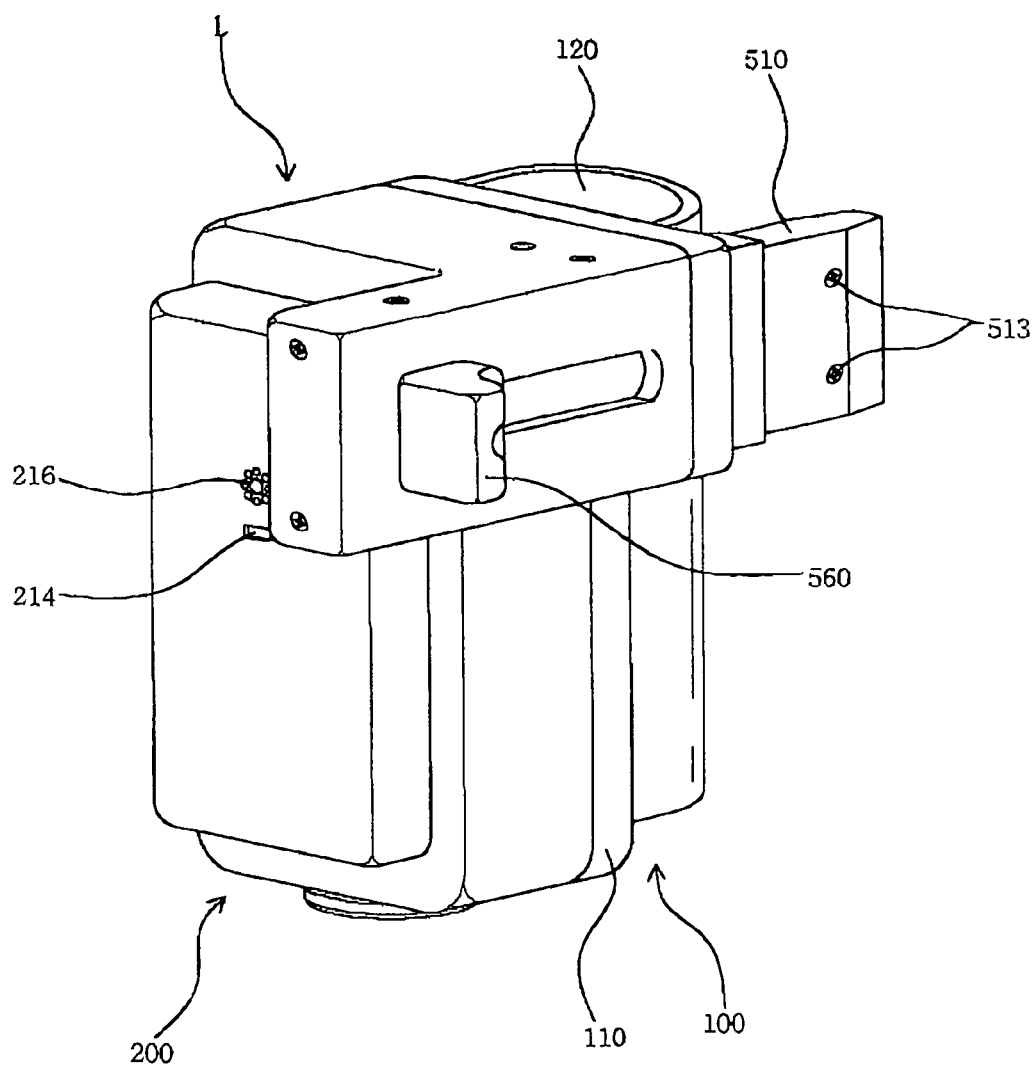

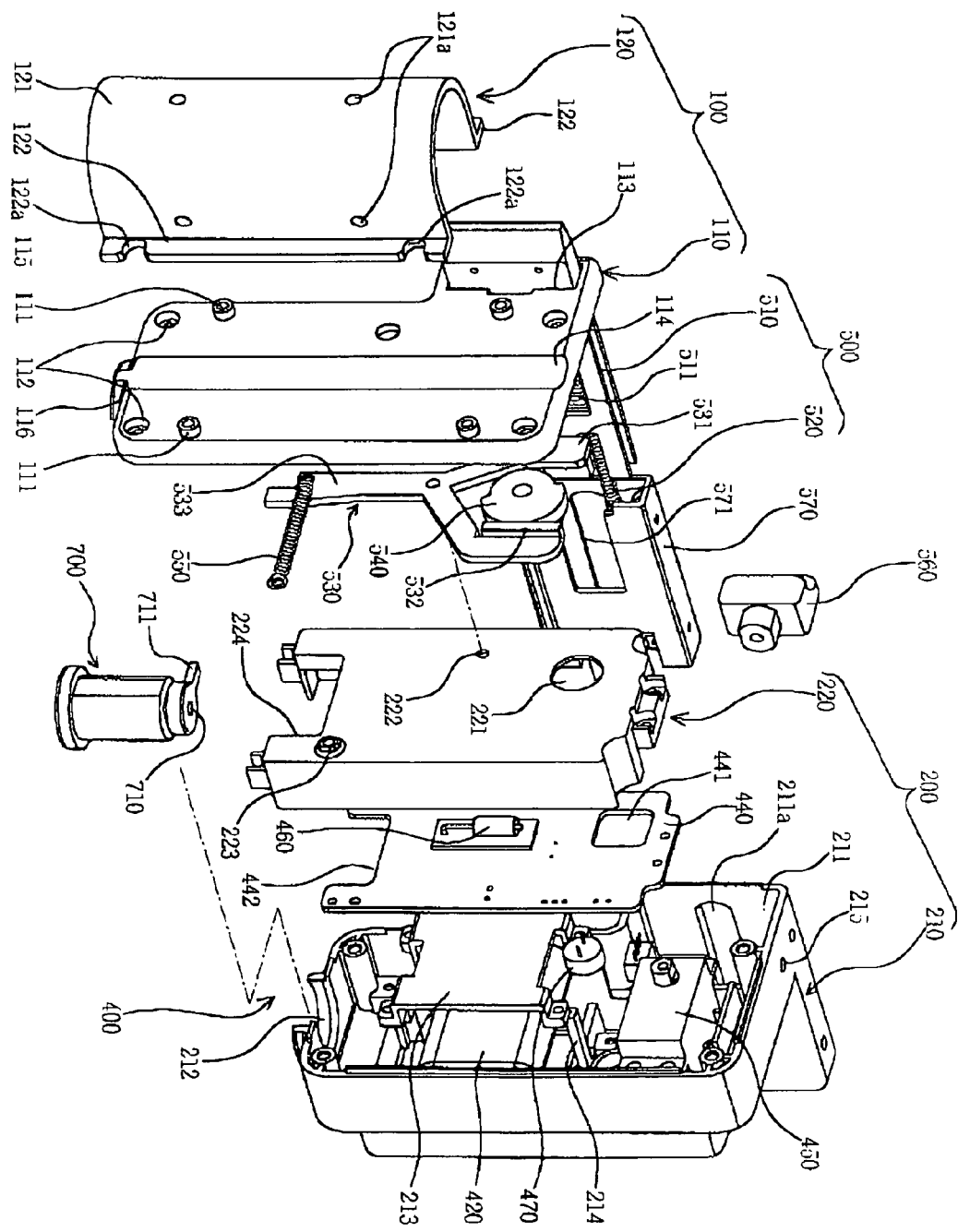
[FIG. 2]

[FIG. 3]
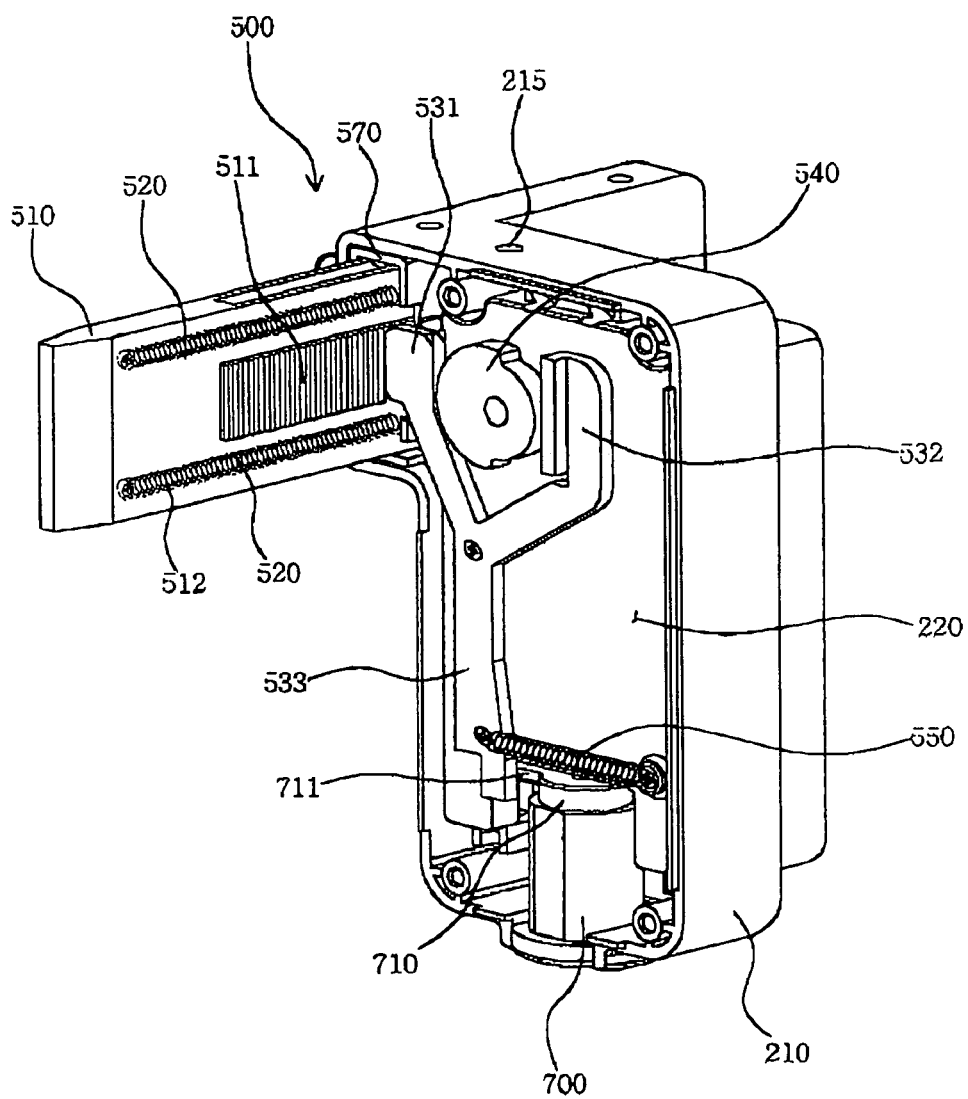

[FIG. 4]
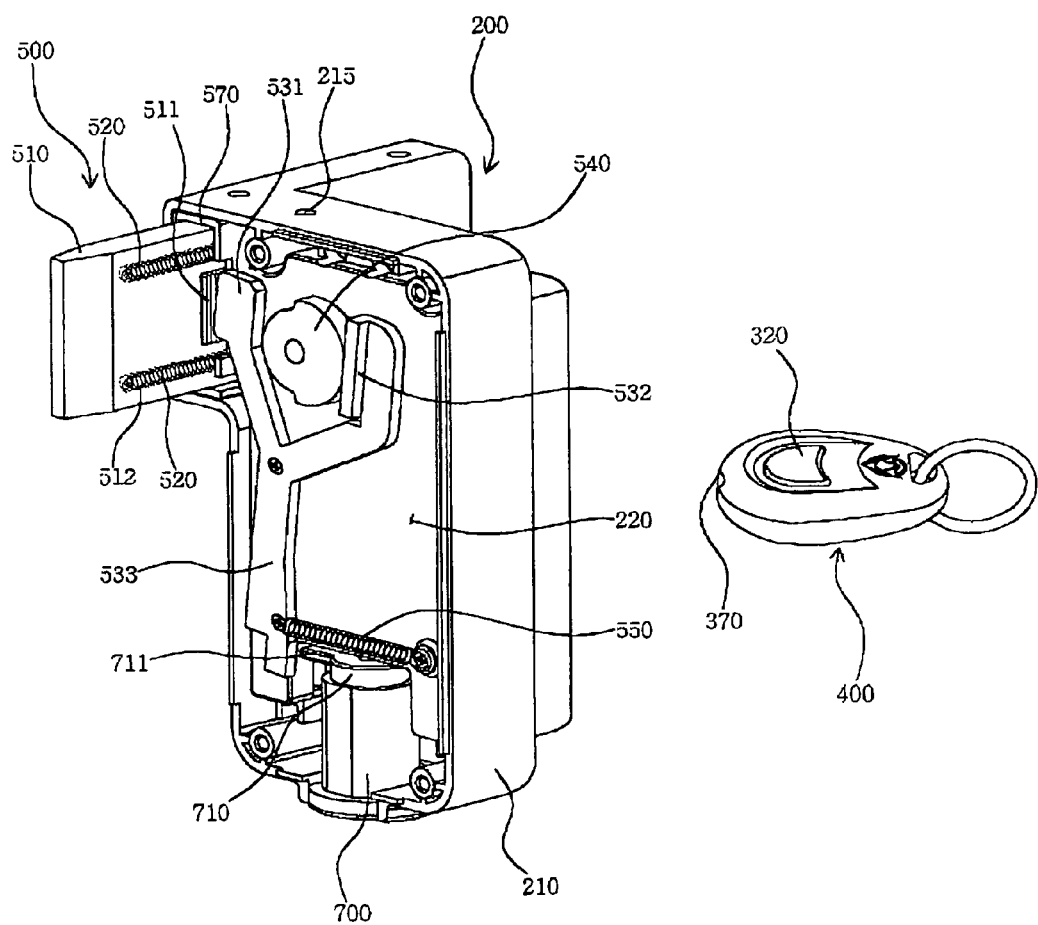

[FIG. 5]
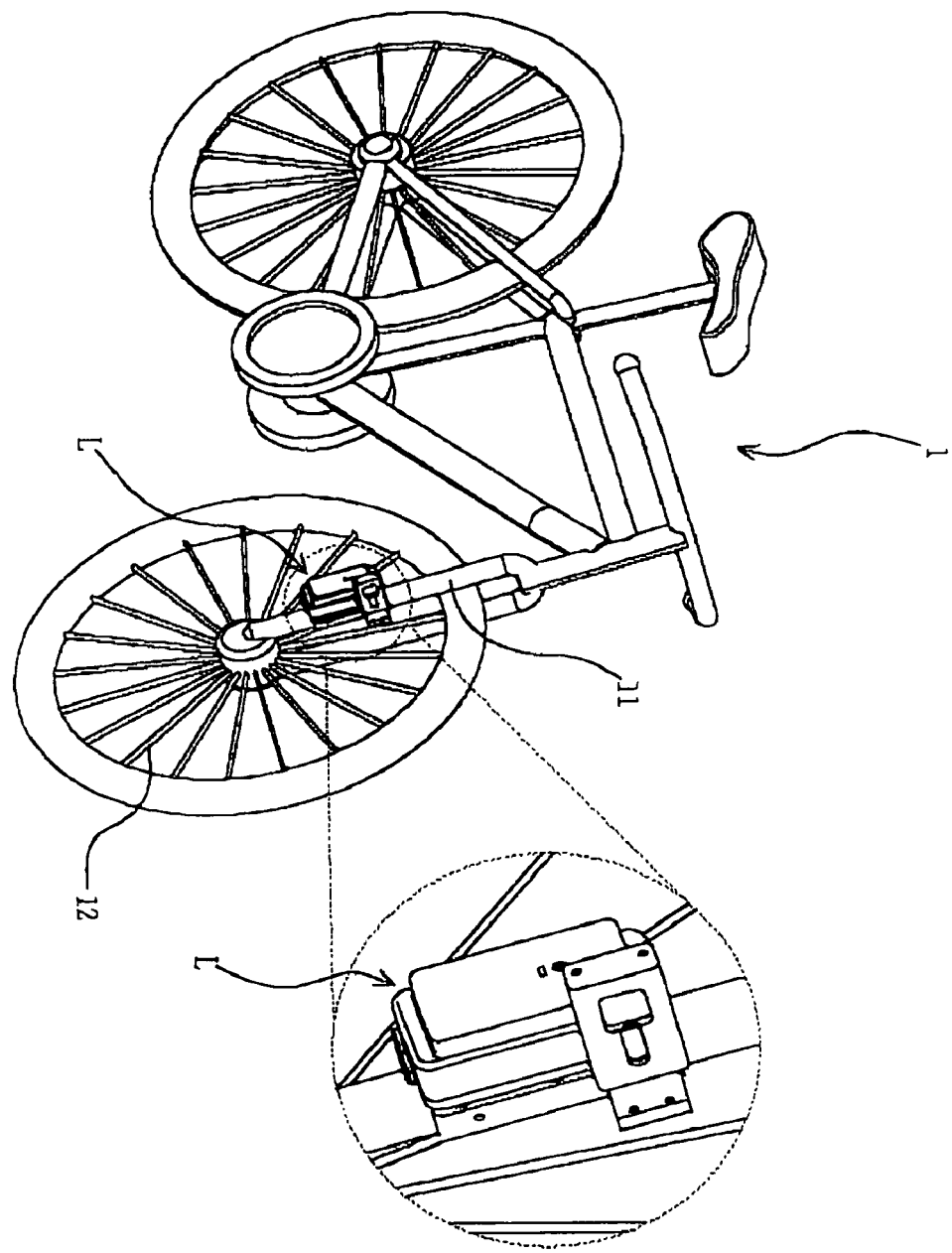

(Fig. 6)
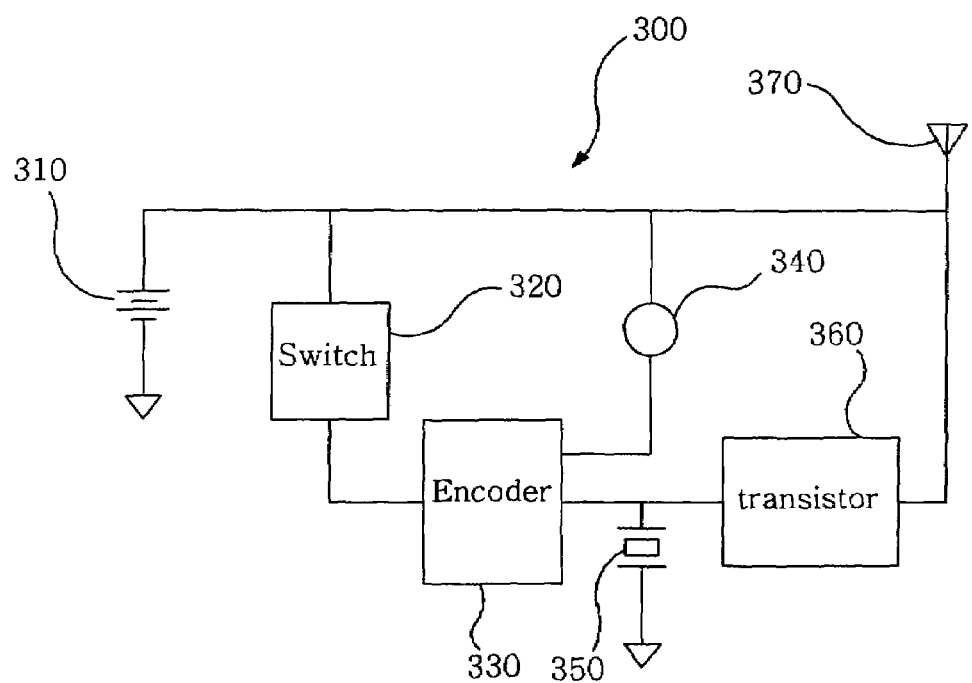

(Fig. 7)
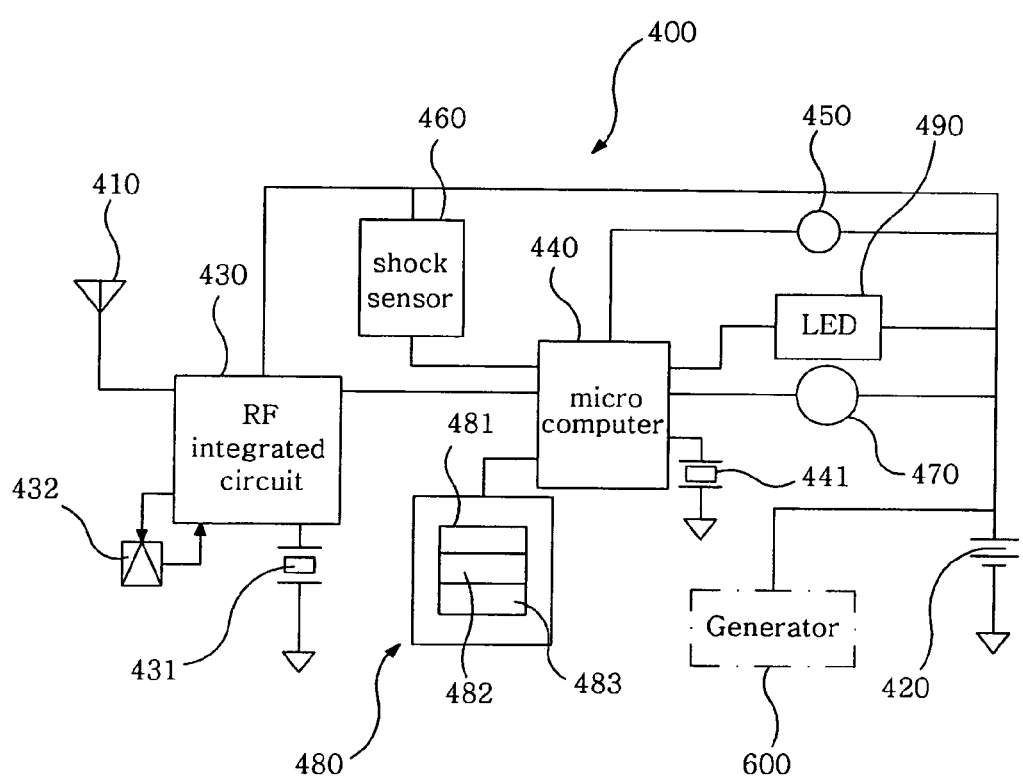

LOCKING DEVICE FOR TWO-WHEELED VEHICLE

BACKGROUND OF THE INVENTION

1. Field of the Invention

The present invention relates to a locking device for a two-wheeled vehicle, and in particular to a locking device for a two-wheeled vehicle in which a two-wheeled vehicle is locked or unlocked semi-automatically, and when a certain impact is applied to a two-wheeled vehicle, it is informed to an user, and a battery is charged using a generator operating in contact with a wheel.

2. Description of the Background Art

Generally, a locking device for a two-wheeled vehicle has been used in order to prevent a robbery of a two-wheeled vehicle. The conventional locking device includes a wire that is adapted to connect a vehicle body frame and a pole installed at a two-wheeled vehicle storage place, or is adapted to connect vehicle wheels and a vehicle body frame, and a locker capable of locking a ring of both ends of the wire. However, the conventional locking device has a problem that when the wire is cut, the two-wheeled vehicle might be robbed. In addition, a user should directly connect a vehicle body frame and a pole using a wire, or connect vehicle wheels and a vehicle body frame and then to lock or unlock for thereby causing many inconvenience.

In an advanced locking device, the construction is so complicated. It is expensive. There are many problems in storing and carry the same.

SUMMARY OF THE INVENTION

Accordingly, it is an object of the present invention to overcome the problems encountered in the conventional art.

It is another object of the present invention to provide a locking device for a two-wheeled vehicle capable of semi-automatically locking or unlocking a locking device for a two-wheeled vehicle.

It is further another object of the present invention to provide a locking device for a two-wheeled vehicle in which when a certain impact is applied to a two-wheeled vehicle, it is applied to an user for thereby achieving an efficient management of a two-wheeled vehicle by preventing any damage.

It is still further another object of the present invention to provide a locking device for a two-wheeled vehicle in which it is not needed to charge a battery in such a manner that a battery is charged using a generator operating in contact with a wheel.

To achieve the above objects, there is provided a locking device for a two-wheeled vehicle comprising an engaging unit that includes a rear plate member installed at an inner side of a wheel support frame of a two-wheeled vehicle, and an attaching pipe that is designed to surround the wheel support frame and is selectively fixed at the rear plate member; a receiving casing unit that is engaged at one side surface of the engaging unit and is installed in a direction of an outer side of the wheel support frame; a receiving unit that is engaged at the receiving casing unit, receives an external high frequency through an antenna when it is received through a transmission unit, converts the received high frequency into an intermediate frequency using a RF (Radio Frequency) integrated circuit, transfers to a microcomputer and allows a motor to rotate in one direction in accordance with a control of the microcomputer; and a locking/unlocking unit that is installed in such a manner that a lock appears and disappears between the engaging unit and the receiving casing unit and selectively controls the rotation of a wheel installed at the wheel support frame of the two-wheeled vehicle.

In the locking device for a two-wheeled vehicle according to the present invention, a plurality of through holes are formed at a bending unit in such a manner that the wheel support frame of the attaching pipe is surrounded.

In the locking device for a two-wheeled vehicle according to the present invention, the receiving casing unit includes a front casing installed at an outer side of the same; and a low casing that is installed between the front casing and the rear plate member of the engaging unit and is engaged at the front casing, wherein a generator connection unit is installed at an upper side of the front casing and is connected with a wire of the generator.

In the locking device for a two-wheeled vehicle according to the present invention, there is further provided a shock sensor installed at a microcomputer of the receiving unit for detecting an external impact; and a buzzer that is designed to generate an alarming sound in accordance with a signal from the microcomputer when a signal is received from the shock sensor.

In the locking device for a two-wheeled vehicle according to the present invention, the microcomputer includes a lock detec designed so that the microcomputer judges a lock state as it is pushed to a lock position using hands, and a contact point is connected in the interior; a cam detec that is designed to detect an operation that a motor is rotated by one rotation and returns to its original position; and a switch provided for a coding in such a manner that an ID is provided in one-to-one method with respect to the transmission unit.

In the locking device for a two-wheeled vehicle according to the present invention, the locking/unlocking unit includes a lock that is inserted into a through hole of the rear plate member; a pair of tensile springs of which one end is internally installed in a longitudinal direction of the lock, and other end is fixed at the lock input and output receiving unit of the front casing; a leg that is operable in a hole of the low casing; a cam that is installed at one side of the leg and is rotatable with respect to a rotary shaft of the motor wherein said cam is designed in such a manner that one end of the same is repeatedly inserted or escaped from the lock; a tensile spring of which one end is fixed at a lower side of the leg and the hole; and a handle that is fixed at the lock so that the lock is moved in a longitudinal direction.

In the locking device for a two-wheeled vehicle according to the present invention, the lock further includes a lock housing in which the other end of the tensile spring is fixed wherein its one end is fixed, and said lock is mounted in the lock input and output receiving unit formed at the front casing of the receiving casing unit in cooperation with the lock housing, and a hole having a certain depth is formed at the lock wherein the tensile spring is inserted into the hole, and a ring of the tensile spring is fixed by a screw engaged at an end in a vertical direction with respect to the center of the hole.

In the locking device for a two-wheeled vehicle according to the present invention, the leg includes an insertion protrusion that is inserted into the stop protrusion of the lock at a portion near the lock; an operation unit that has a contact surface and is operable in contact with the cam at an opposite side of the insertion protrusion; and an elastic pressurizing unit that is provided at an extended lower side of the insertion protrusion and the operation unit and is connected with the tensile spring.

In the locking device for a two-wheeled vehicle according to the present invention, a protrusion having a certain length in one direction is formed at the lower sides of the engaging unit and the receiving casing unit, and there is provided a key assembly having a manual lock unlocking cam capable of unlocking a locked state of the locking/unlocking unit in such a manner that the manual lock unlocking cam is rotated as the key is rotated.

BRIEF DESCRIPTION OF THE DRAWINGS

The present invention will become better understood with reference to the accompanying drawings which are given only by way of illustration and thus are not limitative of the present invention, wherein;

FIG. 1 is a perspective view illustrating a locking device for a two-wheeled vehicle according to an embodiment of the present invention;

FIG. 2 is a disassembled perspective view of FIG. 1;

FIG. 3 is a perspective view illustrating major elements in order to describe a state that a lock controls a rotation of a two-wheeled vehicle as the legs of FIG. 2 operates;

FIG. 4 is a perspective view illustrating major elements in order to describe a state that a leg of FIG. 2 does not control a rotation of a two-wheeled vehicle;

FIG. 5 is a perspective view illustrating an installation state of a locking device for a two-wheeled vehicle according to an embodiment of the present invention;

FIG. 6 is a block diagram of a transmitter installed at a remote controller of FIG. 4; and FIG. 7 is a block diagram of a receiver provided at a printed circuit board according to an embodiment of the present invention.

DETAILED DESCRIPTION OF THE PREFERRED EMBODIMENTS

The preferred embodiments of the present invention will be described with reference to the accompanying drawings.

As shown in FIGS. 1, 2 and 5, a locking device L for a two-wheeled vehicle according to the present invention includes an engaging unit 100 having a rear plate member 110 installed at an inner side of a wheel support frame 11 of a two-wheeled vehicle 1, and a fixing pipe 120 designed to surround the wheel support frame 11 and selectively fixed to the rear plate member 110, a receiving casing unit 200 that is attached at one surface of the engaging unit and is installed in an outer direction of the wheel support frame 11, a receiving unit 400 that is engaged at the receiving casing unit and receives through an antenna 410 when an external high frequency is transmitted through a transmission unit 300 and converts into an intermediate frequency by an RF (Radio Frequency) integrated circuit 430 and transfers to a microcomputer 440 and is designed so that a motor 450 is rotated in one direction, and a locking/unlocking unit 500 that is installed so that a lock 510 is appeared and disappeared between the engaging unit 100 and the receiving casing unit 200 and selectively controls the rotation of a wheel 12 installed at the wheel support frame 11 of the two-wheeled vehicle 1.

Therefore, when the transmission unit 300 outputs a signal, the motor 450 is rotated by the receiving unit 400, and a locked state of the locking/unlocking unit 500 is unlocked. When the lock 510 of the locking/unlocking unit 500 is forwardly moved using a handle 560, a locked state is obtained.

The rear plate member 110 includes a plurality of holes 111 for engaging with the attaching pipe 120. A plurality of holes 112 is formed for an engagement at an inner surface of a front casing 210 of the receiving casing unit 200. A lock guide hole 113 is formed at one side of the upper end of the rear plate member wherein the lock 510 is inserted thereinto and is moved. An arc shaped groove 114 is formed in the longitudinal direction of the rear plate member 110 for achieving an easier mounting of the wheel support frame 11. Reference numeral 115 represents a through hole by which a head of a screw engaged to a rotation center of a leg 530 is not interfered with other elements. The through hole 115 may not be provided. A key assembly-mounting unit 116 is formed at a portion opposite to the lock guide hole 113. The key assembly-mounting unit 116 may have different constructions.

In addition, the attaching pipe 120 includes a bending unit 121 for surrounding the wheel support frame 11, and a flange 122 extended from both ends of the bending unit 121 and closely contacting with the rear plate member 110. The flange 122 has an engaging unit 122a so that an engaging member such as a bolt is engaged into the hole 111.

The bending unit 121 has a plurality of through holes 121a. The screws are engaged into the through holes for thereby stably fixing to the wheel support frame 11. In addition, a plate spring (not shown) is installed at an inner surface of the bending unit 121 using the through holes 121a, so that the bending unit 121 is stably fixed to the wheel support frame 11.

As shown in FIG. 2, the engaging unit 122a may be formed in a structure of which one side is opened and may be formed in a through hole shape.

Therefore, it is stably fixed to the wheel support frame 11 using the rear plate member 110 and the attaching pipe 120 of the engaging unit 100.

The receiving casing unit 200 includes a front casing 210 installed at an outer side of the same, and a lower casing 220 that is disposed between the front casing and the rear plate member 110 of the engaging unit 100 and is engaged to the front casing.

The front casing 210 includes a lock input and output receiving unit 211 that is protruded from an upper one side so that the lock 510 of the locking/unlocking unit 500 appears or disappears, and a key assembly installation unit 212 formed at a lower side of the lock input and output receiving unit 211 so that a key assembly 700 is mounted. In addition, a battery cover 213 is installed at an inner side surface of the front casing 210 for fixing the battery 420. A reflector 214 is fixedly inserted into an inner surface of one side and is installed near a LED 490 installed at a microcomputer 440 of the receiving unit 400, so that a charged state of a low battery is checked by transferring light of the LED 490 to the outside, and an operation state from the transmission unit 300 is recognized wherein the reflector 214 has a certain length.

A generator connection unit 215 is provided at an upper side of the front casing 210 in such a manner that a wire of the generator 600 is connected over the position in which a lock housing is inserted, and an upper side of a lateral wall of the low casing. In an embodiment of the present invention, the generation connection unit 215 is formed of a through hole, but the construction is not limited thereto. It may be formed in a protruded nut shape so that a wire is inputted into a screw groove. A buzzer hole 216 is formed at a front surface of the front casing 210.

The low casing 220 includes a through hole 221 formed in such a manner that a shaft is engaged to an inner engaging surface of the front casing 210 and is connected with the motor 450 of the receiving unit 400. A plurality of holes is formed at a surrounding portion of the through hole.

The hole includes a rotation center hole 222 that is a center at which a leg of the locking/unlocking unit 500 is rotated, and a spring fixing hole 223 connected with one end of a tensile spring installed to pull the leg.

An operation groove 224 of a manual lock unlocking cam 710 is formed at a lower side of the low casing 220 in order to prevent any interference when a protrusion 711 of the key assembly 700 is rotated wherein the operation groove 224 has a certain width and depth.

Therefore, the receiving unit 400 is stably disposed between the front casing 210 and the low casing 220.

As shown in FIGS. 4 and 6, the transmission unit 300 is constructed in such a manner that an encoder 330 outputs a blinking signal to the LED 340 based on an operation of a switch 320 in a state that a power 310 is supplied. A high frequency is oscillated in a crystal 350 connected with the encoder 330 and is amplified by a transistor 360. There is provided an antenna 370.

As shown in FIGS. 2 and 7, the receiving unit 400 is engaged at the receiving casing unit 200. When an external high frequency is transmitted through the transmission unit 300, the frequency is received through the antenna 410. The frequency is converted into an intermediate frequency at the EF integrated circuit 430 to which the power of the battery 420 is supplied, and the frequency is transferred to the microcomputer 440. The motor 450 is rotated in one direction in accordance with a control signal of the microcomputer 440.

Here, the battery 420 is formed in a rechargeable type battery and is connected with the generator for thereby charging the battery. In the present invention, it is possible to overcome the problems that batteries should be exchanged.

An oscillation device 431 is connected with one side of the RF (Radio Frequency) integrated circuit 430 in order to generate an intermediate frequency. The IF filter 432 is connected with the other side of the RF integrated circuit in order to filter an intermediate frequency.

A shock sensor 460 is connected with the microcomputer 440 for thereby detecting an external impact. A buzzer 470 is connected for thereby generating an alarming sound in accordance with a signal from the microcomputer that received the signal of the shock sensor. In addition, a resonator 441, a clock generator, is connected with the microcomputer 440 in order to execute the command of the microcomputer. The microcomputer 440 is connected with a switch 480 for the sake of a lock detec 481 capable of judging a locked state by the microcomputer as contact points are connected when it is manually pushed in the direction of the locking position; a cam detec 482 for recognizing that the motor is rotated one time and is returned in position; and a coding 483 for providing an ID based on one to one with respect to the transmission unit 300. A LED 490 is connected and turned on and off in response to a signal from the microcomputer when the microcomputer 440 receives a signal of the shock sensor 460 or an operation signal of the motor 450.

The microcomputer 440 includes a through hole 441 so that a rotary shaft of the motor 450 is rotated. An operation groove 442 of the manual lock unlocking cam 710 having a certain width and depth is formed at a lower side of the microcomputer 440 in order to prevent any interference when the protrusion 711 of the key assembly 700 is rotated.

As shown in FIGS. 1 through 4, the locking/unlocking unit 500 includes a lock 510 inserted into a through hole 113 of the rear plate member 110, a pair of tensile spring 520 of which one end is embedded in a longitudinal direction of the lock and the other end is fixed at a lock input and output receiving unit 211 of the front casing 210, a leg 530 that is operable in a hole 222 of the low casing 220, a cam 540 that is provided at one side of the leg and is rotatable with respect to a rotary shaft of the motor 450 wherein one end of the same is repeatedly engaged and disengaged from the lock 510, a tensile spring 550 of which one end is fixed to a lower side of the leg and the hole 223, and a handle 560 designed to move the lock 510 in a longitudinal direction.

The leg 530 is formed in a Y-shape. An insertion protrusion 531 is formed at a portion near the lock 510 and is inserted into a stop protrusion 511 of the lock. An operation unit 532 is formed at a portion opposite to the insertion protrusion and is operable in contact with the cam 540. An elastic pressurizing unit 533 is provided at an extended lower side of the insertion protrusion and the operation unit and is connected with the tensile spring 550.

When the motor 450 operates in a state that the lock 510 is protruded, the insertion protrusion 531 of the leg 530 is escaped from the stop protrusion unit 511 of the lock 510. At this time, the lock 510 is pulled by the tensile spring 520, so that it becomes a unlock state. Thereafter, the tensile spring 550 is changed from the unlock state to the lock state. When changing to the lock state by pulling out the lock 510, the unlock state is achieved by the motor 450 by operating a switch 320 in the transmission unit 300. The wheel 12 is locked by pushing the handle 560, and the insertion protrusion 531 of the leg 530 is inserted into the stop protrusion unit 511 of the lock 510 for thereby achieving a locking state.

The other end of the tensile spring 520 is fixed at a lock housing 570 with its one end being fixed. The lock 510 is assembled using screws in such a manner that the lock 510 is mounted in the lock input and output receiving unit 211 in cooperation with the lock housing 570, so that it is possible to achieve a water resistance operation when rain is inputted. The hole 512 into which the tensile spring 520 is inserted is formed with a certain depth. The ring of the tensile spring 520 is fixed by a screw 513 engaged to an end portion in a vertical direction with respect to the center of the hole.

The protrusion 561 of the handle 560 is inserted into longitudinal holes 211a and 571 formed at the lock input and output receiving unit 211 and the lock housing 570 and is slidable in a longitudinal direction.

A groove is formed at the upper and lower sides of the lock 510, a protrusion is formed at the upper and lower sides of the lock housing 570, so that a more stable guide is achieved as compared to when the guide is made in a longitudinal direction.

As shown in FIG. 7, the generator 600 is connected with the battery 420 of the receiving unit 400 through the upper side of the receiving casing unit 200.

The power is generated in such a manner that the wheel installed at the wheel support frame 11 contacts with the generator 600 and is supplied to the battery 420 for thereby achieving a charging operation, so that it is not needed to exchange the battery for a long time.

As shown in FIGS. 2 through 4, a key assembly 700 is installed at the lower sides of the engaging unit 100 and the receiving casing unit 200.

A protrusion 711 having a certain length in one direction is formed at the upper end of the key assembly 700. A manual lock unlocking cam 710 is installed for unlocking the lock state of the locking/unlocking unit 500 by rotating the key.

Therefore, when the key is inserted into the key assembly 700 and is rotated, the manual lock unlocking cam 710 is rotated, and the elastic pressurizing unit 533 of the locking/unlocking unit 500 is pressurized by the protrusion 711, so that the leg 530 is rotated with respect to the center of the rotation. The insertion protrusion 531 is escaped from the stop protrusion unit 511 of the lock 510 for thereby unlocking the locked state.

As described above, according to the present invention, it is possible to semi-automatically repeatedly perform the locking and unlocking operations of the locking device for a two-wheeled vehicle.

When a certain external impact is applied to the two-wheeled vehicle, it is informed to the owner of the two-wheeled vehicle, so that it is easy to manage the two-wheeled vehicle with respect to the impact.

In the present invention, it is possible to charge the battery using the generator that operates in contact with the wheel, so that it is not needed to exchange the battery for thereby achieving an easier use.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A locking device for a two-wheeled vehicle, comprising:
    an engaging unit that includes a rear plate member installed at an inner side of a wheel support frame of a two-wheeled vehicle, and an attaching pipe that is designed to surround the wheel support frame and is selectively fixed at the rear plate member;
    a receiving casing unit that is engaged at one side surface of the engaging unit and is installed in a direction of an outer side of the wheel support frame;
    a receiving unit that is engaged at the receiving casing unit, receives an external high frequency through an antenna when it is received through a transmission unit, converts the received high frequency into an intermediate frequency using a RF (Radio Frequency) integrated circuit, transfers to a microcomputer and allows a motor to rotate in one direction in accordance with a control of the microcomputer; and
    a locking/unlocking unit that is installed in such a manner that a lock appears and disappears between the engaging unit and the receiving casing unit and selectively controls the rotation of a wheel installed at the wheel support frame of the two-wheeled vehicle.

2. The device of claim 1, wherein a plurality of through holes is formed at a bending unit in such a manner that the wheel support frame of the attaching pipe is surrounded.

3. The device of claim 1, wherein said receiving casing unit includes: a front casing installed at an outer side of the same; and
    a low casing that is installed between the front casing and the rear plate member of the engaging unit and is engaged at the front casing,
    wherein a generator connection unit is installed at an upper side of the front casing and is connected with a wire of the generator.

4. The device of claim 1, further comprising:
    a shock sensor installed at a microcomputer of the receiving unit for detecting an external impact; and
    a buzzer that is designed to generate an alarming sound in accordance with a signal from the microcomputer when a signal is received from the shock sensor.

5. The device of claim 1, wherein said microcomputer includes:
    a lock detector designed so that the microcomputer judges a lock state as it is pushed to a lock position using hands, and a contact point is connected in the interior;
    a cam detector that is designed to detect an operation that a motor is rotated by one rotation and returns to its original position; and
    a switch provided for a coding in such a manner that an ID is provided in one-to-one method with respect to the transmission unit.

6. The device of claim 1, wherein said locking/unlocking unit includes:
    a lock that is inserted into a through hole of the rear plate member,
    a pair of tensile springs of which one end is internally installed in a longitudinal direction of the lock, and other end is fixed at the lock input and output receiving unit of the front casing;
    a leg that is operable in a hole of the low casing;
    a cam that is installed at one side of the leg and is rotatable with respect to a rotary shaft of the motor wherein said cam is designed in such a manner that one end of the same is repeatedly inserted or escaped from the lock;
    a tensile spring of which one end is fixed at a lower side of the leg and the hole; and
    a handle that is fixed at the lock so that the lock is moved in a longitudinal direction.

7. The device of claim 6, wherein said lock further includes a lock housing in which the other end of the tensile spring is fixed wherein its one end is fixed, and said lock is mounted in the lock input and output receiving unit formed at the front casing of the receiving casing unit in cooperation with the lock housing, and a hole having a certain depth is formed at the lock wherein the tensile spring is inserted into the hole, and a ring of the tensile spring is fixed by a screw engaged at an end in a vertical direction with respect to the center of the hole.

8. The device of claim 6, wherein said leg includes:
    an insertion protrusion that is inserted into the stop protrusion of the lock at a portion near the lock;
    an operation unit that has a contact surface and is operable in contact with the cam at an opposite side of the insertion protrusion; and
    an elastic pressurizing unit that is provided at an extended lower side of the insertion protrusion and the operation unit and is connected with the tensile spring.

9. The device of claim 1, wherein a protrusion having a certain length in one direction is formed at the lower sides of the engaging unit and the receiving casing unit, and there is provided a key assembly having a manual lock unlocking cam capable of unlocking a locked state of the locking/unlocking unit in such a manner that the manual lock unlocking cam is rotated as the key is rotated.

* * * * *